(12) United States Patent
Wang et al.

(10) Patent No.: US 8,251,341 B2
(45) Date of Patent: Aug. 28, 2012

(54) FLAT-PANEL DISPLAY MONITOR

(75) Inventors: Jin-Xin Wang, Shenzhen (CN);
Chao-Zhong Fu, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/292,204

(22) Filed: Nov. 9, 2011

(65) Prior Publication Data

US 2012/0057282 A1 Mar. 8, 2012

Related U.S. Application Data

(62) Division of application No. 12/344,669, filed on Dec. 29, 2008, now Pat. No. 8,074,956.

(30) Foreign Application Priority Data

Aug. 26, 2008 (CN) .......................... 2008 1 0304196

(51) Int. Cl.
*F16M 13/00* (2006.01)
*F16M 11/00* (2006.01)
*F16M 11/04* (2006.01)
*H05K 5/00* (2006.01)
*H05K 7/00* (2006.01)

(52) U.S. Cl. ..................... 248/688; 248/158; 248/176.3; 361/679.21; 361/679.22; 361/679.27

(58) Field of Classification Search .................. 248/371, 248/372.1, 393, 397, 398, 923, 922, 133, 248/136, 454, 455, 458, 460, 463, 919; 361/679.21, 361/679.22

See application file for complete search history.

(56) References Cited

U.S. PATENT DOCUMENTS

| | | | | |
|---|---|---|---|---|
| 5,016,849 A | * | 5/1991 | Wu | 248/176.3 |
| 5,566,048 A | * | 10/1996 | Esterberg et al. | 361/679.27 |
| 5,799,372 A | * | 9/1998 | Brunner et al. | 16/342 |
| 6,085,388 A | * | 7/2000 | Kaneko | 16/338 |
| 6,570,627 B1 | * | 5/2003 | Chang | 348/794 |
| 7,048,242 B2 | * | 5/2006 | Oddsen, Jr. | 248/280.11 |
| 7,584,525 B2 | * | 9/2009 | Chern, Jr. | 16/342 |
| 7,591,443 B2 | * | 9/2009 | Lee et al. | 248/158 |
| 7,649,576 B2 | * | 1/2010 | Ogawa et al. | 348/794 |
| 7,679,892 B2 | * | 3/2010 | Jung | 361/679.21 |
| 7,690,081 B2 | * | 4/2010 | Chern, Jr. | 16/342 |
| 7,743,467 B2 | * | 6/2010 | Wang et al. | 16/342 |
| 7,913,357 B2 | * | 3/2011 | Peng et al. | 16/321 |
| 2005/0263660 A1 | * | 12/2005 | Hsiung | 248/291.1 |

(Continued)

*Primary Examiner* — Teri P. Luu
*Assistant Examiner* — Chiedu Chibogu
(74) *Attorney, Agent, or Firm* — Altis Law Group, Inc.

(57) ABSTRACT

A flat-panel display monitor is disclosed. The flat-panel display monitor comprises a display body comprising a support portion formed at an edge thereof; and a support stand connected to the display body so that the support portion of the display body and the support cooperatively support the flat-panel display monitor, the support stand comprising a support member comprising a base portion and two arched plates extending from an end of the base portion; two friction members, each of the two friction members is rotatably clamped by each of the two arched plates; a first connecting bracket connected to first of the two friction members; and a second connecting bracket connected to second of the two friction members, wherein the second connecting bracket is detachably attached to the first connecting bracket.

6 Claims, 5 Drawing Sheets

U.S. PATENT DOCUMENTS

| | | | |
|---|---|---|---|
| 2006/0232916 A1* | 10/2006 | Chou et al. | 361/681 |
| 2006/0272129 A1* | 12/2006 | Rude et al. | 16/342 |
| 2007/0096001 A1* | 5/2007 | Lee | 248/371 |
| 2007/0097610 A1* | 5/2007 | Lee | 361/681 |
| 2009/0008518 A1* | 1/2009 | Shen | 248/122.1 |

* cited by examiner

US 8,251,341 B2

FLAT-PANEL DISPLAY MONITOR

CROSS-REFERENCE TO RELATED APPLICATION

The present application is a divisional application of U.S. patent application Ser. No. 12/344,669, filed on Dec. 29, 2008, which claims all benefits accruing under 35 U.S.C. §119 from CN 200810304196.8, filed on Aug. 26, 2008, the contents of which are hereby incorporated by reference.

BACKGROUND

1. Field of the Invention

The present disclosure generally relates to display monitors and, particularly, to a flat-panel display monitor using a support stand.

2. Description of the Related Art

A viewing angle of a display screen of a flat-panel display monitor can be adjusted by a support stand, so that users can view the display screen from different positions.

A typical support stand may includes a monitor bracket, a hinge assembly, a support bracket, and a base member. The monitor bracket is attached to the flat-panel display monitor. The hinge assembly is connected to the monitor bracket and the support bracket. The support bracket is positioned on the base member. The hinge assembly may include a pivot shaft, a friction washer, a plurality of resilient washers, a rotary member rotatably sleeved on the shaft, and a fastening member. The rotary member and the shaft are fixed to the monitor bracket and the support bracket. The friction washer and the resilient washers are sleeved on the pivot shaft. The resilient washers create an axial force to push the friction washer to resist the rotary member. The fastening member is fixed on an end of the pivot shaft to prevent the resilient washers and the friction washer from detaching from the pivot shaft. The monitor bracket together with rotary member may be positioned in any position relative to the shaft because of friction created between the friction washer and the rotary member.

However, the typical support stand may includes many components, thus the cost of the typical support stand may be relatively high. In addition, it may be troublesome to assemble the support stand. Furthermore, over time, the friction causes abrasion of the engaging surfaces of the rotary member and the friction washer, resulting in little or no friction between the rotary member and the friction washer. Thus, the monitor bracket together with the rotary member may be incapable of remaining in any desired position. Therefore, the support stand may have a relatively short usage life.

Therefore, a new support stand for a flat-panel display monitor is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE EMBODIMENTS

Figure 1:
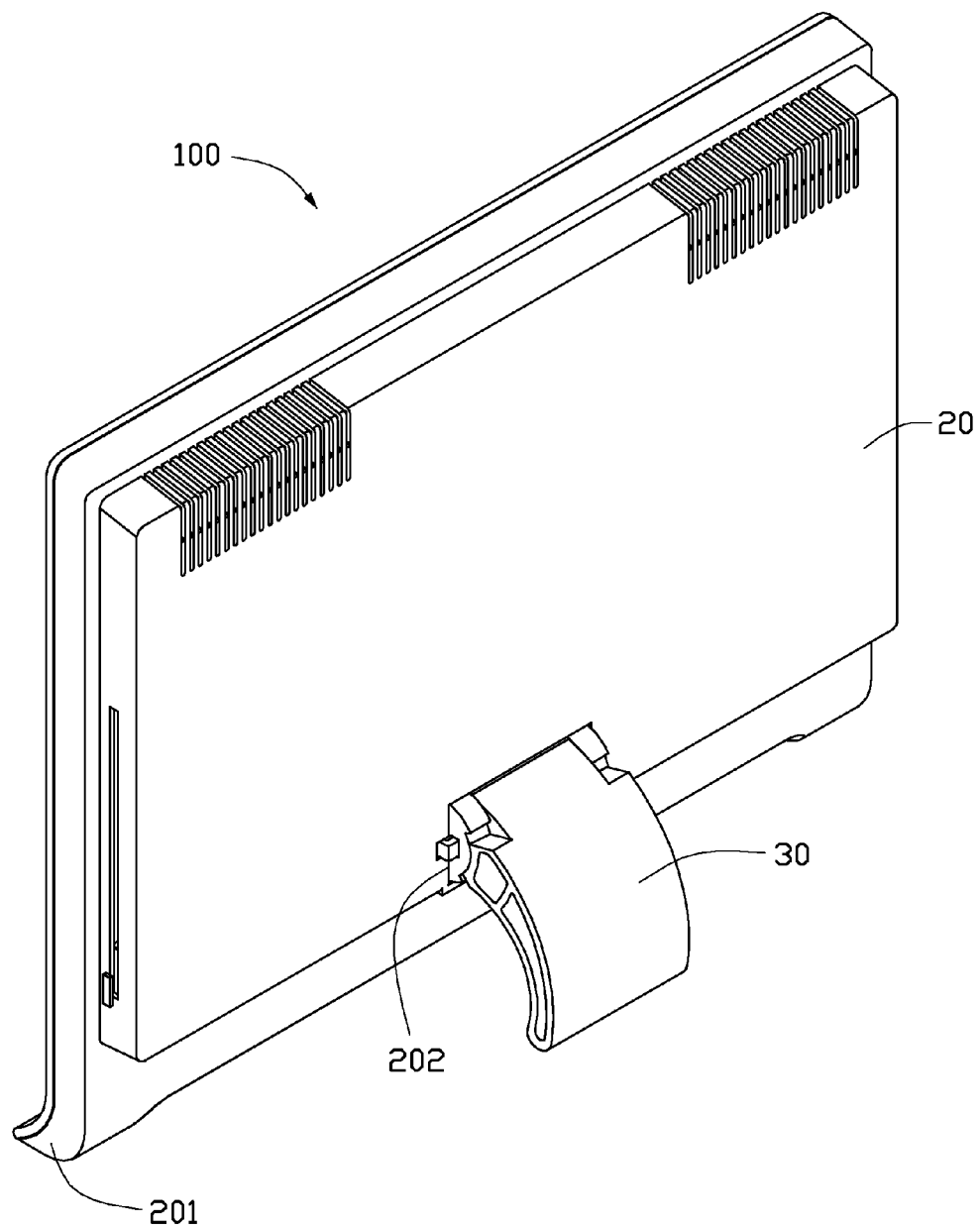
FIG. 1 is an assembled, isometric view of one embodiment of a flat-panel display monitor, the flat-panel display monitor comprises a support stand.

The present support stand may be used for electronic devices such as display devices and integral computers such as computers with display screens and host computers positioned in an integrally frame, and so on. Referring to FIG. 1, for the purposes of conveniently describing the present electronic device, one embodiment of a flat-panel display monitor 100 is described and illustrated.

The flat-panel display monitor 100 comprises a display body 20, and a support stand 30 connected to the display body 20. The display body 20 comprises a support portion 201 formed at an edge of the display body 20. The support portion 201 bends towards one side of the display body 20. The display body 20 further defines a latching groove 202 adjacent to a middle part of the support portion 201.

Figure 2:
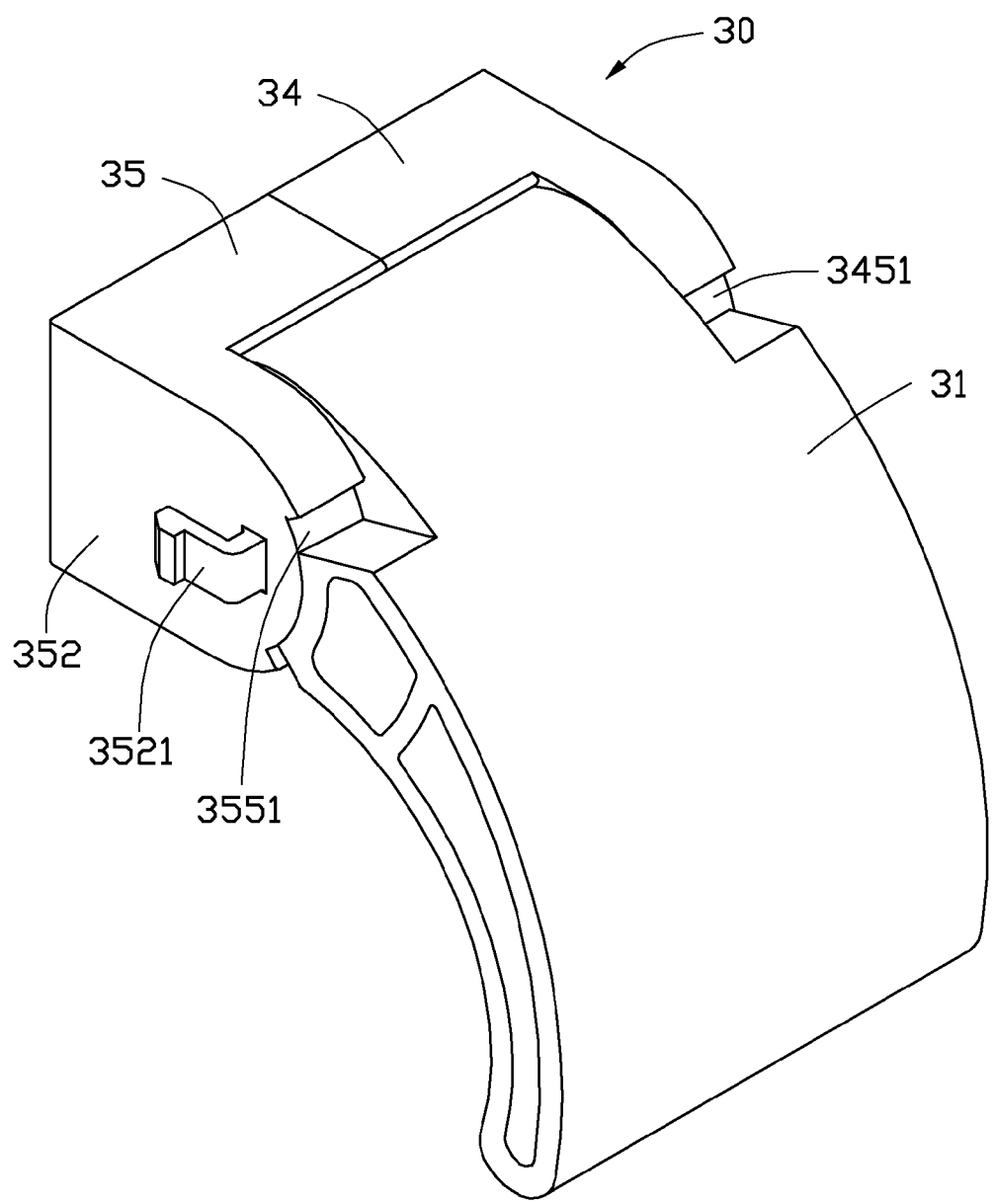
FIG. 2 is an assembled, isometric view of the support stand of FIG. 1.
Figure 3:
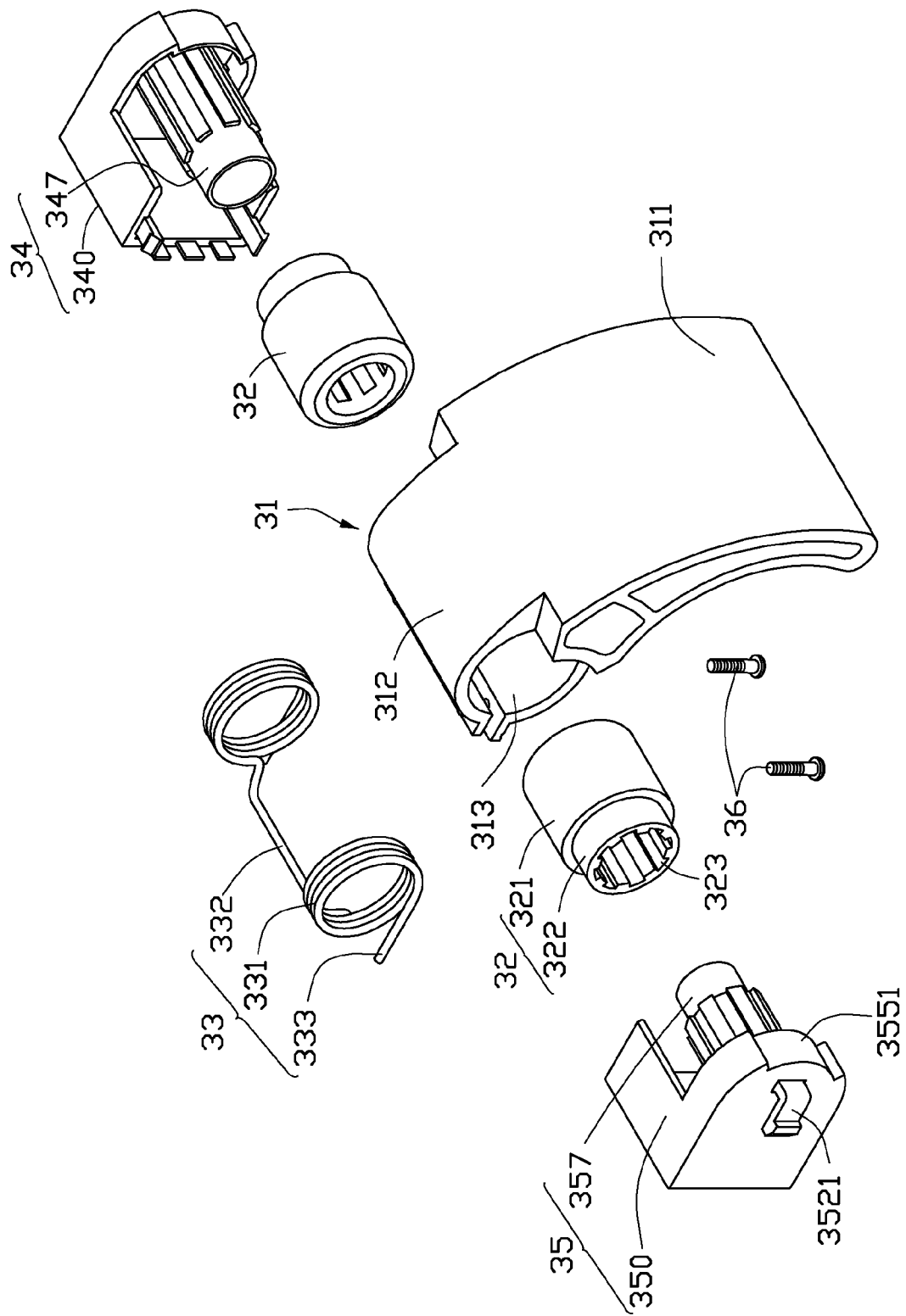
FIG. 3 is an exploded, isometric view of the support stand of FIG. 2 from another aspect.
Figure 4:
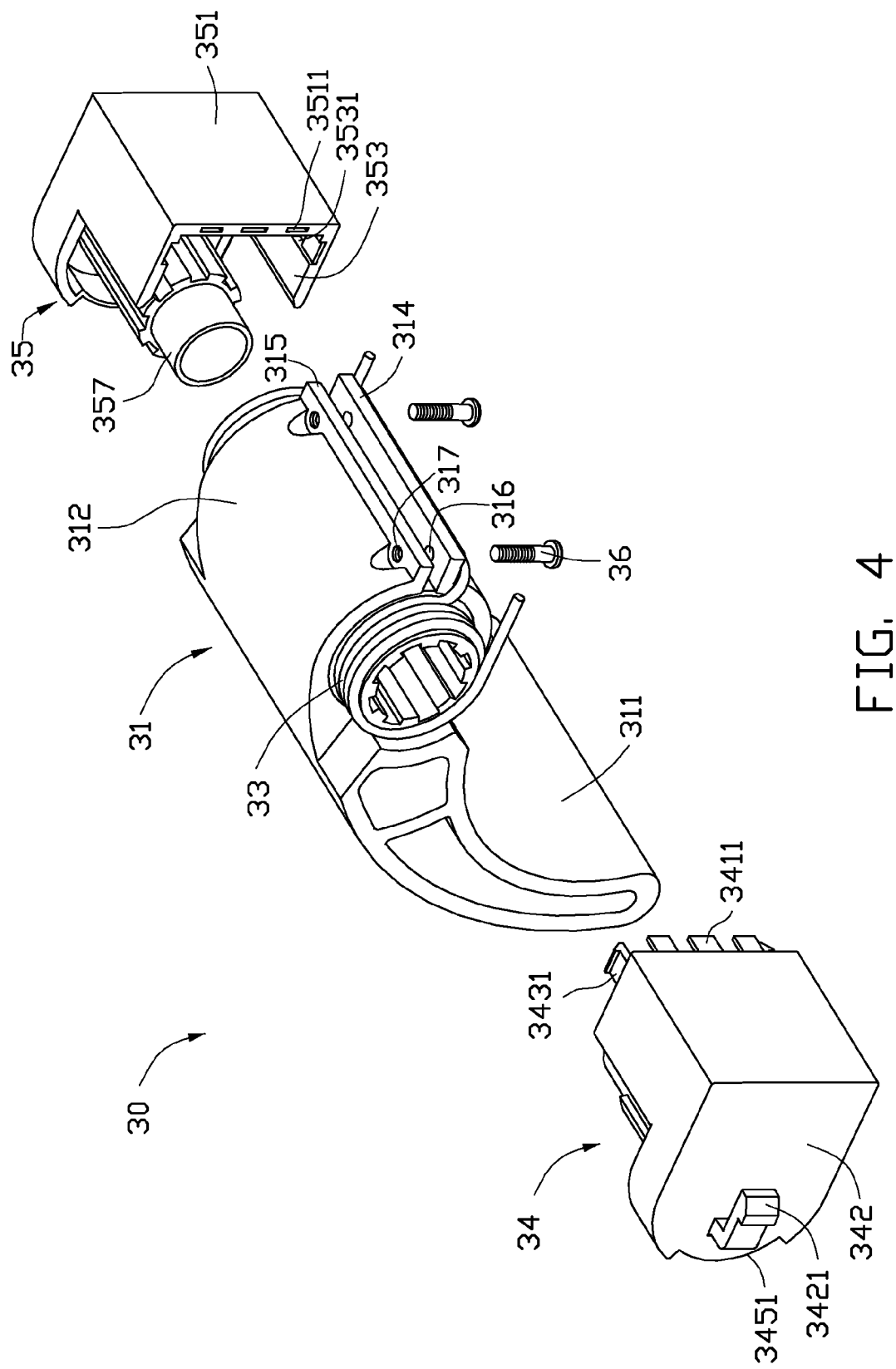
FIG. 4 is a partially exploded, isometric view of the support stand of FIG. 2 from another aspect.

Referring to FIGS. 2 through 4, the support stand 30 comprises a support member 31, two friction members 32, a torsion spring 33, a first connecting bracket 34, a second connecting bracket 35, and two fixing members 36.

The support member 31 comprises a hollow base portion 311 and two arched plates 312 extending from an end of the base portion 311. The base portion 311 may be substantially arched. The arched plates 312 cooperatively define a receiving hole 313. A first fixing portion 314 extends from an end of a first of the two arched plates 312, and a second fixing portion 315 extends from an end of a second of the two arched plates 312. The first and second fixing portions 314, 315 may be plate-shaped and substantially parallel to each other. The first fixing portion 314 defines two through holes 316 and the second fixing portion defines two threaded holes 317.

Each of the two friction member 32s comprises a friction portion 321, and a connecting portion 322 extending from an end of the friction portion 321. Both the cylindrical friction portion 321 and the connecting portion are substantially cylindrically shaped. The friction member 32 defines an engaging hole (not labeled) extending through the friction portion 321 and the connecting portion 322. An outer diameter of the friction portion 321 is larger than an outer diameter of the connecting portion 322. An inner surface of the engaging hole uniformly defines a plurality of elongated grooves 323 having a length than a length of the friction member 32. The plurality of elongated grooves 323 are substantially parallel.

The torsion spring 33 includes two spring coils 331, a connecting arm 332 connecting each of the two spring coils 331, and two resisting ends 333. Each of the two resisting ends 333 extends from each of the two spring coils 331. A length of the connecting arm 332 is substantially equal to the length of the arched plate 312.

Figure 5:
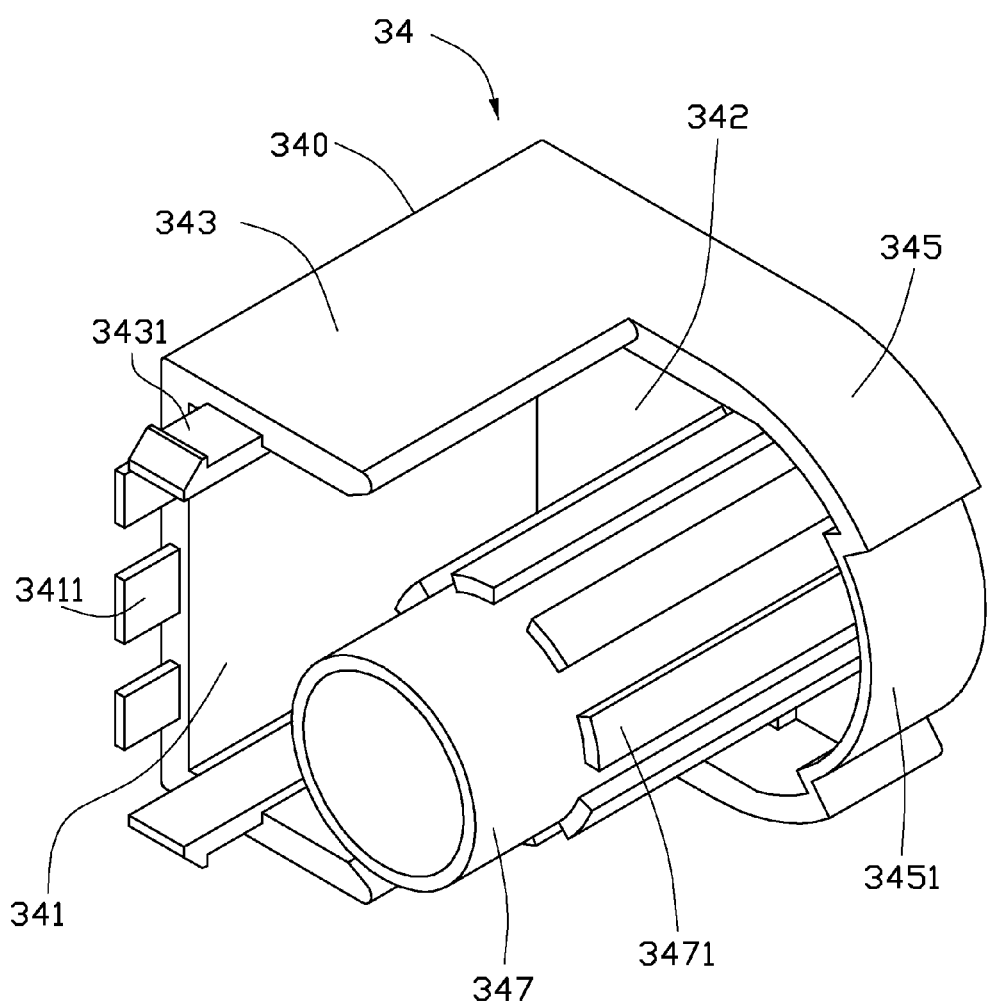
FIG. 5 is an isometric view of a connecting bracket of the support stand of FIG. 2.

Referring also to FIG. 5, the first connecting bracket 34 includes a main body 340 and an engaging portion 347 connected to the main body 340. The main body 340 includes a first base wall 341, a second base wall 342, two first side walls 343, and a second side wall 345. The first base wall 341 is substantially perpendicularly connected to a side of the second base wall 342. Each of the two first side walls 343 extend substantially perpendicularly from opposite sides of the base wall 341 and are substantially perpendicular to the second base wall 342. The second side wall 345 may be arched in shape and extends substantially perpendicularly from the second base wall 342. Opposite ends of the second side wall 345 are connected to each of the two first side walls 343. A plurality of positioning pieces 3411 extend from an end portion of the first base wall 341 away from the second base wall 342. A hook portion 3421 is formed on an outer surface of the second base wall 342. An end portion of each of the two first side walls 343 away from the second base wall 342 forms a latching hook 3431. The second side wall 345 defines a restricting groove 3451. The engaging portion 347 is substantially a hollow cylinder extending substantially perpendicularly from an inner surface of the second base wall 342. The engaging portion 347 includes a plurality of elongated protrusions 3471 uniformly formed on an outer surface of the engaging portion 347. The plurality of elongated protrusions are substantially parallel. The plurality of elongated protrusions 3471 correspond to the plurality of elongated grooves 323 of the friction member 32.

The second connecting bracket 35 is similar in principle to the first connecting bracket 34. The second connecting bracket comprises a main body 350, and an engaging portion 357 connected to the main body 350. However, an end portion of a first base wall 351 away from a second base wall 352 defines a plurality of positioning holes 3511 to engage with the plurality of positioning pieces 3411 of the first connecting bracket 354, and an inner surface of each of two first side walls 353 defines a fixing groove 3531 to engage with the latching hook 3431 of each of the two first side wall 343 of the first connecting bracket 34.

Each of the two fixing members 36 may be screws.

The support member 31, the first and second connecting brackets 34, 35 may be made of a rigid plastic such as acrylonitrile butadiene styrene (ABS) or polycarbonate. Each of the two friction members 32 may be made of a soft plastic such as silica gel or polyurethane.

Referring to FIGS. 1 through 5 again, the friction portions 321 of each of the two friction members 32 are inserted into the receiving hole 313 from opposite sides of the support member 31. Each of the two spring coils 331 of the torsion spring 33 are sleeved on each of the connecting portions 322 of the two friction members 32, and the connecting arm 332 abuts one of the first fixing portion 314 and the second fixing portion 315. Each of the two fixing members 36 is passed through each of the two through holes 316 of the first fixing portion 314, and screwed into each of the two threaded holes 317 of the second fixing portion 315, so that each of the two friction members 32 is rotatably clamped by each of the two arched plates 312. Each of the engaging portions 347 and 357 are inserted into each of the two friction members 32. The plurality of positioning pieces 3411 are inserted into the plurality of positioning holes 3511, and the latching hook 3431 is latched into the fixing groove 3531. Thus, opposite sides of an end of the base portion 311 of the support member 31 are partially received in the restricting groove 3451 of the first connecting bracket 34 and a restricting groove 3551 of the second connecting bracket 35. One of the two resisting ends 333 of the torsion spring 33 abuts an inner surface of one of the two first side walls 343 of the first connecting bracket 34 and another one of the two resisting ends 333 abuts an inner surface of one of the two first side walls 353 of the second connecting bracket 35.

After the support stand 30 is assembled, portions of the first and second connecting brackets 34, 35 are latched in the latching groove 202 of the display body 20 via the hook portion 3421 of the first connecting bracket 34 and a hook portion 3521 of the second connecting bracket 35, thereby connecting the support stand 30 to the display body 20. When the flat-panel display monitor 100 is positioned on a support surface, such as a flat surface of a desk, the support member 31 of the support stand 30 and the support portion 201 of the display body 20 are supported by the support surface. Since friction is created between the support member 31 and the two friction members 32, the support member 31 may not rotate relative to the display body 20. A viewing angle of the display body 20 may be adjusted by applying an external force on a top edge of the display body 20 or on the support member 31, so that the support member 31 is rotated relative to the display body 20. When the external force is released, the friction prevents the support member 31 from rotating relative to the display body 20. A rotating range of base portion 31 relative to the display body 20 is limited by the restricting groove 3451 of the first connecting bracket 34 and the restricting groove 3551 of the second connecting bracket 35.

The support stand 30 only comprises several components, so the cost of the support stand 30 may be relatively low and may be simple to assemble the support stand 30. When the two friction members 32 are rotatably clamped by the arched plates 312 of the support member 31, a clamping force between the arched plates 312 and the two friction members 32 may be conveniently adjusted by varying the tension of the fixing members 36. Therefore, the friction between the support member 31 and the two friction members 32 may be adjusted to adapt to display bodies with different weights. In addition, a contact surface between the two friction members 32 and the arched plates 312 of the support member 31 is relatively large, so after repeated use, the friction may be still sufficient for holding the support member 31 in any position, thereby prolonging a usage life of the support stand 30.

It may be appreciated that the torsion spring 33 may be omitted. In addition, the support stand 30 may include only one friction member including a friction portion rotatably clamped by arched plates 312 of the support member 31 and two connecting portions extending from opposite ends of the friction portion. The connecting portions may be connected to the engaging portion 347 of the first connecting bracket 34 and the engaging portion 357 of the second connecting bracket 35. The support member 31 and the first and second connecting brackets 34, 35 may also be made of other rigid materials, such as a powder metallurgy material.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A flat-panel display monitor, comprising:
 a display body comprising a support portion formed at an edge thereof; and
 a support stand connected to the display body so that the support portion of the display body and the support stand cooperatively support the display body, the support stand comprising:
 a support member comprising a base portion and two arched plates extending from an end of the base portion;
 two friction members, each of the two friction members is rotatably clamped by each of the two arched plates;
 a first connecting bracket connected to first of the two friction members; and
 a second connecting bracket connected to second of the two friction members, wherein the second connecting bracket is detachably attached to the first connecting bracket;

wherein the two arched plates cooperatively define a receiving hole; each of the two friction members comprises a cylindrical friction portion rotatably received in the receiving hole, and a connecting portion extending from an end of the friction portion; the connecting portion extends out of the receiving hole; the first connecting bracket and the second connecting bracket are non-rotatably connected to the connecting portions of each of the two friction members;

wherein each of the two friction members defines an engaging hole extending through the friction portion and the connecting portion; each of the first and second connecting brackets comprises a main body and an engaging portion connected to the main body; each engaging portion of the first and second connecting brackets is inserted into the engaging hole from the connecting portions of each of the two friction members.

2. The flat-panel display monitor of claim 1, wherein each of the two friction members comprises a plurality of substantially parallel elongated grooves in an inner surface of the engaging hole; each of the first and second connecting brackets comprises a plurality of substantially parallel elongated protrusions on an outer surface of the engaging portion, the plurality of substantially parallel elongated protrusions are configure to latch into the plurality of substantially elongated grooves.

3. The flat-panel display monitor of claim 1, wherein each of the first and second connecting brackets comprises a hook portion formed on an outer surface of the main body; the display body further defines a latching groove adjacent to a middle part of the support portion; portions of the first and second connecting brackets are latched in the latching groove of the display body via each of the hook portions.

4. The flat-panel display monitor of claim 1, wherein the support member further comprises a first fixing portion extending from first of the two arched plates, and a second fixing portion extending from second of the two arched plates; the first fixing portion defines two through holes; the second fixing portion defines two threaded holes; and the support stand further comprises two fixing members; each of the two fixing members are adapted to pass through each of the two through holes, and screw into each of the two threaded holes so that a clamping force between the two arched plates and the two friction members is adjustable by adjusting the tension of the fixing members.

5. The flat-panel display monitor of claim 4, wherein the support stand further comprises a torsion spring comprising two spring coils, a connecting arm connecting each of the two spring coils, and a resisting end extending from each of the two spring coils; each of the two spring coils is sleeved on the connecting portion of each of the two friction members, the connecting arm abuts one of the first fixing portion and the second fixing portion, and each of the two resisting ends abuts each of the first connecting bracket and the second connecting bracket.

6. The support stand of claim 1, wherein the first and the second connecting brackets are both made of plastic, and the first and the second connecting brackets have a hardness greater than a hardness of the two friction members.

* * * * *